United States Patent
Batarseh et al.

(10) Patent No.: US 7,196,916 B2
(45) Date of Patent: Mar. 27, 2007

(54) ALTERNATED DUTY CYCLE CONTROL METHOD FOR HALF-BRIDGE DC-DC CONVERTER

(75) Inventors: Issa Batarseh, Orlando, FL (US); Jaber A. Abu-Qahouq, Orlando, FL (US); Hong Mao, Orlando, FL (US)

(73) Assignee: University of Central Florida Research Foundation, Orlando, FL (US)

( * ) Notice: Subject to any disclaimer, the term of this patent is extended or adjusted under 35 U.S.C. 154(b) by 0 days.

(21) Appl. No.: 11/353,822

(22) Filed: Feb. 14, 2006

(65) Prior Publication Data
US 2006/0181906 A1   Aug. 17, 2006

(51) Int. Cl.
G05F 1/10  (2006.01)
G05F 1/40  (2006.01)
H02M 3/335 (2006.01)

(52) U.S. Cl. .................... 363/24; 323/235; 363/21.06
(58) Field of Classification Search ................ 363/17, 363/21.04, 24, 25, 41, 21.06; 323/235
See application file for complete search history.

(56) References Cited

U.S. PATENT DOCUMENTS

| | | | |
|---|---|---|---|
| 5,539,630 A * | 7/1996 | Pietkiewicz et al. | 363/17 |
| 5,541,828 A * | 7/1996 | Rozman | 363/21.1 |
| 5,808,879 A * | 9/1998 | Liu et al. | 363/17 |
| 5,877,945 A * | 3/1999 | Liu | 363/17 |
| 5,936,853 A * | 8/1999 | Mweene | 363/44 |
| 6,822,882 B1 * | 11/2004 | Jacobs et al. | 363/21.06 |
| 6,836,414 B1 * | 12/2004 | Batarseh et al. | 363/17 |
| 6,882,548 B1 * | 4/2005 | Jacobs et al. | 363/21.06 |
| 6,954,367 B2 * | 10/2005 | Yang et al. | 363/98 |
| 6,980,447 B1 * | 12/2005 | Schaible et al. | 363/56.05 |
| 7,049,712 B2 * | 5/2006 | Ying et al. | 307/66 |

* cited by examiner

*Primary Examiner*—Bao Q. Vu
(74) *Attorney, Agent, or Firm*—Brian S. Steinberger; Phyllis K. Wood; Law Offices of Brian S. Steinberger, P.A.

(57) ABSTRACT

Apparatus, methods system and devices for using alternated duty cycle control to achieve soft-switching for at least one switch of the two half-bridge switches. When soft-switching can be only achieved for one switch, alternated duty cycle control alternates the soft-switching between the two switches so that each switch is soft-switched during half of the time and hard-switched during the other half, keeping equal power losses distribution between the switches. When alternated duty cycle control is used, any asymmetry in the duty cycle does not cause asymmetric components stresses or transformer DC bias.

11 Claims, 6 Drawing Sheets

ALTERNATED DUTY CYCLE CONTROL METHOD FOR HALF-BRIDGE DC-DC CONVERTER

FIELD OF THE INVENTION

This invention is related to half-bridge direct current-direct to current converter power supplies and more particularly, to a new alternated duty-cycle shifted pulse width modulation control method for half-bridge direct current to direct current converters to achieve zero-voltage-switching.

BACKGROUND AND PRIOR ART

Half-bridge topology can be a good candidate for high power density direct current-direct current (DC—DC) conversion especially in those applications that use Point-Of-Load DC—DC converters for present and future generation of integrated circuits. This is because of several reasons including structure simplicity, lower number of switches, lower isolation transformer primary side turns since half of the input voltage is applied to the transformer windings, and possibility to achieve soft-switching with the appropriate control. There are two main conventional control schemes used in half-bridge topology. One is the conventional symmetric phase width modulated (PWM) control and the other is the asymmetric (complimentary) control where two driving signals are complimentarily generated.

The switching frequency continues to increase mainly to reduce the size and cost of passive components and to improve the dynamic performance. Hence, soft-switching techniques becomes more desirable in order to reduce the increased switching losses and switches body diode reverse recovery losses at these increased switching frequencies.

When the conventional symmetric control is used for half-bridge, its two switches operate at hard-switching, while when the asymmetric control is used, the two half-bridge switches operate at soft-switching, but unfortunately, causing asymmetric stresses on the converter components which is not desirable especially for wide input voltage range, say 35V~75V or 300V~400V. Moreover, the DC gain is not linear which degrades the converter performance.

SUMMARY OF THE INVENTION

A primary objective of the resent invention is to provide apparatus, methods, system and devices for system control for half-bridge DC—DC converters to achieve zero-voltage switching.

A secondary objective of the resent invention is to provide apparatus, methods, system and devices for soft switching operation for half-bridge DC—DC converters to reducing and keeping equal power losses distribution between the switches.

A third objective of the resent invention is to provide apparatus, methods, system and devices for control of a half-bridge DC—DC converter for improved fidelity, higher efficiency, and reliability.

A half-bridge DC-to-DC converter having a first and a second half-bridge switch and a pulse-width-modulated controller for generating an alternated duty cycle control signal for driving the half-bridge converter to achieve alternating zero-voltage-switching for at least one of the first and second half-bridge switches to reduce output ripple current. The alternated duty cycle control signal includes a first alternated control signal for driving the first half-bridge switch and a second alternated control signal for driving the second half-bridge switch, wherein the soft-switching is alternated between the first and second half-bridge switch so that each one of the first and second half-bridge switches will be soft-switched during half of the time and the other one will be soft-switched during the opposite half of the time.

According to the invention, there is provided a method of driving a half bridge DC—DC converter comprising means for duty cycle shifted control whereby zero-voltage-switching (ZVS) operation is possible and a new soft-switching DC—DC converter that can achieve alternated soft-switching and hard-switching for all its switches whereby reduction of and maintenance of equal power losses distribution between the switches is realized.

Further objects and advantages of this invention will be apparent from the following detailed description of a presently preferred embodiment which is illustrated schematically in the accompanying drawings.

DETAILED DESCRIPTION OF PREFERRED EMBODIMENT

Before explaining the disclosed embodiments of the present invention in detail, it is to be understood that the invention is not limited in its application to the details of the particular methods shown herein since the invention is capable of other embodiments. Also, the terminology used herein is for the purpose of description and not of limitation.

The invention as disclosed herein is derived from the teachings of U.S. Pat. No. 6,836,414 of common assignee whose teachings are fully incorporated herein. The referenced Patent involves topologies for a control scheme to be known as "PWM half-bridge converter with dual-equally adjustable control signal dead-time" to be applied to the half-bridge DC—DC converter to achieve full Zero-Voltage-Switching (ZVS) for one of the switches without adding extra components and without adding asymmetric penalties of complementary control.

The two-channel symmetric PWM driving signals are shifted close to each other, while keeping the PWM control mode. As a result, zero-voltage-switching is achieved because one switch turns on just after the other switch is turned off. Moreover, because the width of the two switches duty cycles is kept equal, the corresponding components work at even conditions with even stresses as in the symmetric control scheme. According to the present invention, a new full zero-voltage-switching half-bridge DC-to-DC converter topology with zero-voltage-switching is achieved for switches by adding an additional branch with a switch across the isolation transformer primary side and by applying the Duty-Cycle Shifted PWM Control.

The present invention provides novel apparatus, method, system and devices for Alternated Duty Cycle (ADC) control which results in soft-switching for at least one switch of the two half-bridge switches. When soft-switching can be only achieved for one switch, ADC control alternates the soft-switching realization between the two switches so that each switch is soft-switched half of the time and hard-switched the other half, keeping equal power loss distribution between the two switches. Moreover, any asymmetry in the duty cycle does not cause asymmetric components stresses when ADC control is used.

Figure 1:
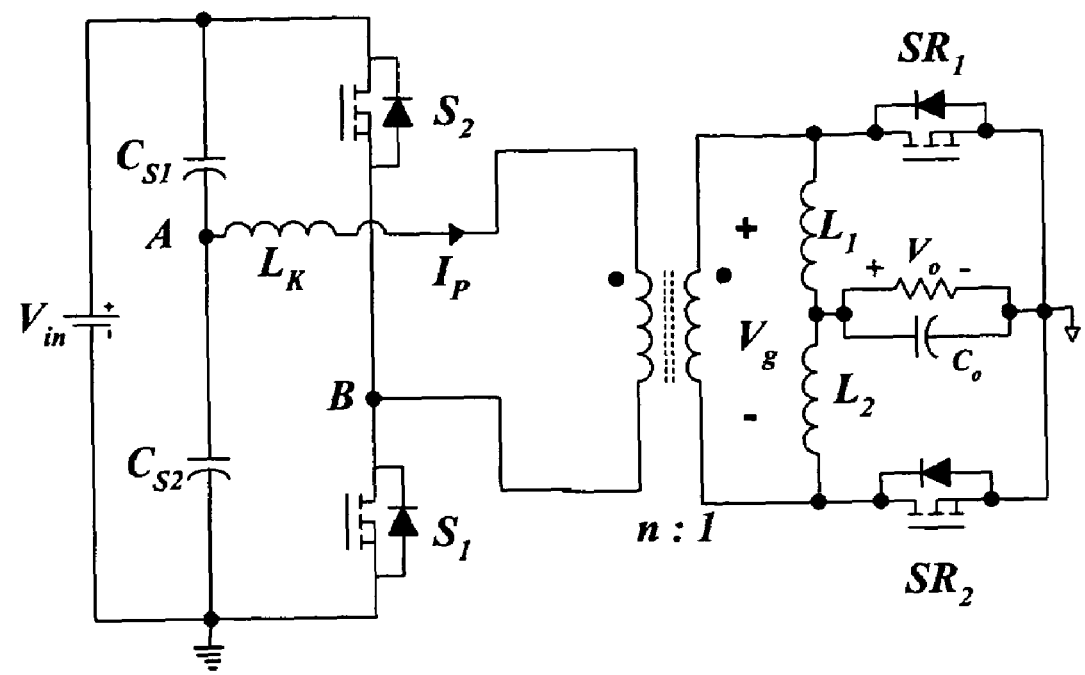
FIG. 1 is a schematic diagram of a half-bridge converter with current doubler secondary side.
Figure 2:
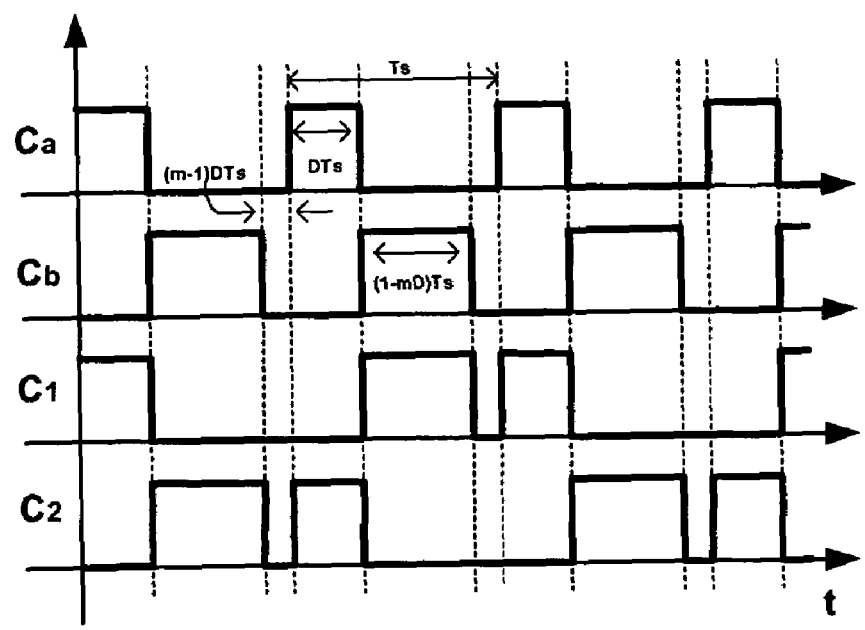
FIG. 2 shows alternated duty cycle control signal waveforms according to the present invention.

Let us assume two arbitrary waveforms, $C_a$ and $C_b$ shown in FIG. 2, generated from the PWM controller for the half-bridge converter as shown in FIG. 1, wherein $T_s$ is the switching cycle period, D is the switching duty cycle or ratio, and m is a real number (can be floating number). When m=1, $C_a$ and $C_b$ become the control signals of asymmetric control, and when m=(1−D)/D, $C_a$ and $C_b$, become the control signals of symmetric control.

Waveforms $C_a$ and $C_b$ in FIG. 2 are the alternated duty cycle control waveforms to drive switch $S_1$ and switch $S_2$ respectively (FIG. 1), where the ON times for $C_a$ and $C_b$ are alternated between the two switches so that switch $S_1$ is turned ON by $C_a$ in the first switching cycle and by $C_b$ in the next switching cycle and vise versa for $S_2$, resulting in $C_a$ and $C_b$, as alternated duty cycle control waveforms.

When $C_a$ and $C_b$ are the asymmetric control signals (when m=1), the resulting ADC control signals $C_1$ and $C_2$ result in symmetric voltages across the half-bridge capacitors $C_{s1}$ and $C_{s2}$ even though the duty cycle is asymmetric since the average duty cycles of $C_1$ and $C_2$ are symmetric. This results in a converter that works but lacks the ability to be regulated for the output voltage at different input and output conditions. The reason is that in order to have the ability to regulate the half-bridge converter, a switching dead time period is required as in the symmetric control or asymmetry is required as in the asymmetric control, which is lost in this example.

Under this condition, when m=1, this topology is suitable in applications where an intermediate "DC transformer" is required and where regulation is not required. Therefore, m is larger than one resulting in losing the soft-switching operation for one switch. However, it is interesting to note that the soft-switching is "alternated" between the two half-bridge switches, i.e., switch $S_1$ will be soft-switched in the first cycle and hard switched in the next cycle and so on, and vise versa for switch $S_2$. When m=(1−D)/D, symmetric (equal) duty cycles are achieved for alternated duty cycle control signal s $C_a$ and $C_b$ and hence for signals $C_1$ and $C_2$. However, in the alternated duty cycle control, equal duty cycle is not required since it does not affect the symmetry of the converter.

Figure 3A:
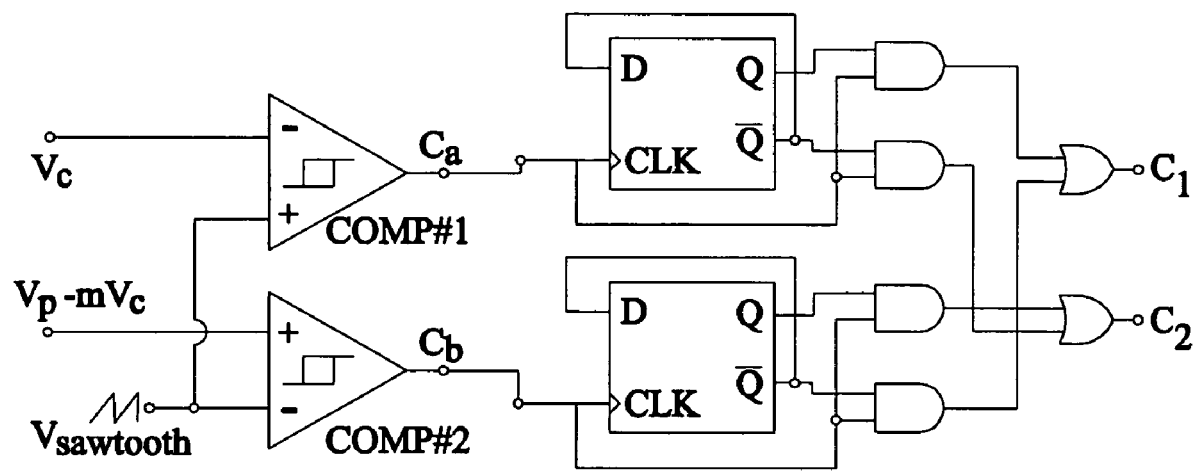
FIG. 3a is a schematic diagram of a modulation circuit for producing alternated duty cycle control signals.
Figure 3B:
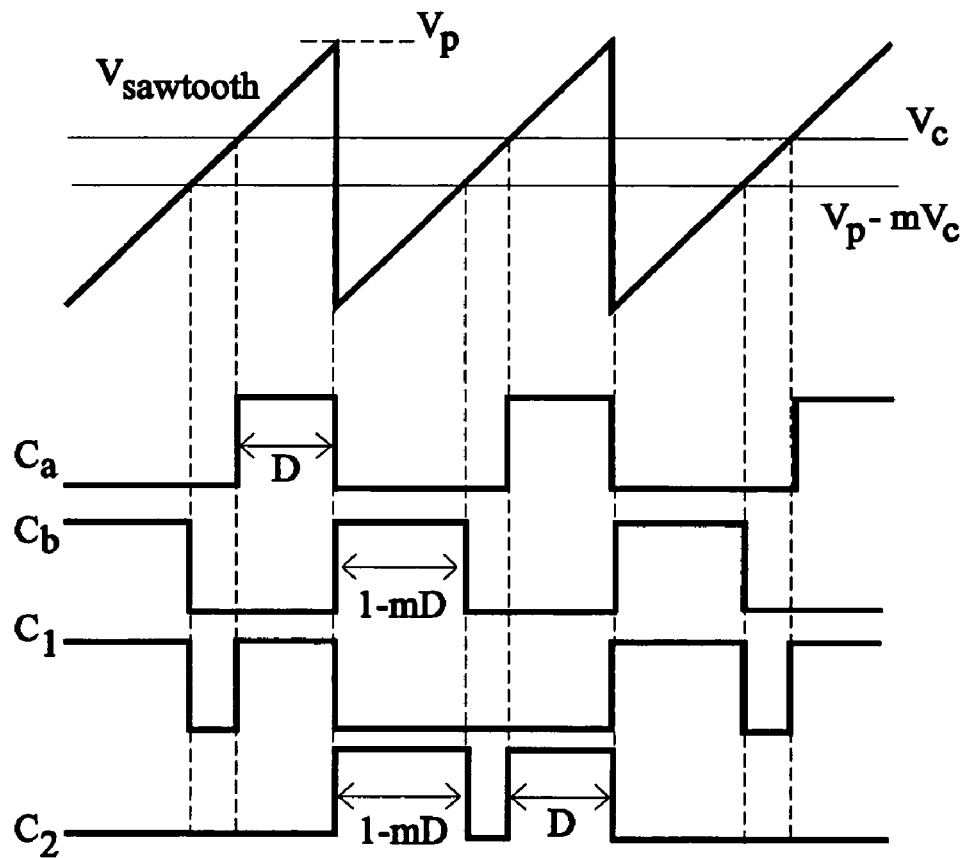
FIG. 3b shows the waveform applied to the input of the modulated circuit shown in FIG. 3a and the alternated duty cycle control signals produced by the modulation circuit.

FIG. 3 shows a simple circuit implementation to generate ADC control signals $C_1$ and $C_2$ from original signals $C_a$ and $C_b$ as described in regard to FIG. 2. Different modulation schemes can be adapted to generate the alternated duty cycle control signals. ADC modulation can be digital modulation or analog modulation. In digital modulation case, it is generally simple to generate any, even complicated, control signals such as those required for ADC control. For the case of analog modulation for alternated duty cycle control, FIG. 3a shows a possible modulation approach for the realization of ADC PWM control. Referring to the waveforms shown in FIG. 3b, $V_{sawtooth}$ is the modulation carrier waveform and Vc is the main control voltage derived from the voltage or current controller/compensator (not shown), from which the other control voltage Vp−mVc is generated, where Vp is the peak voltage of the carrier $V_{sawtooth}$. By modulating $V_c$ and $V_p$−mVc, the signals $C_a$ and $C_b$ can be generated at the outputs of the comparators, from which the final half-bridge switches control signals, $C_1$ and $C_2$, are then generated using a logic stage that consists of D-flip-flops, AND logic gates, and OR logic gates, as shown in FIG. 3a.

Figure 4:
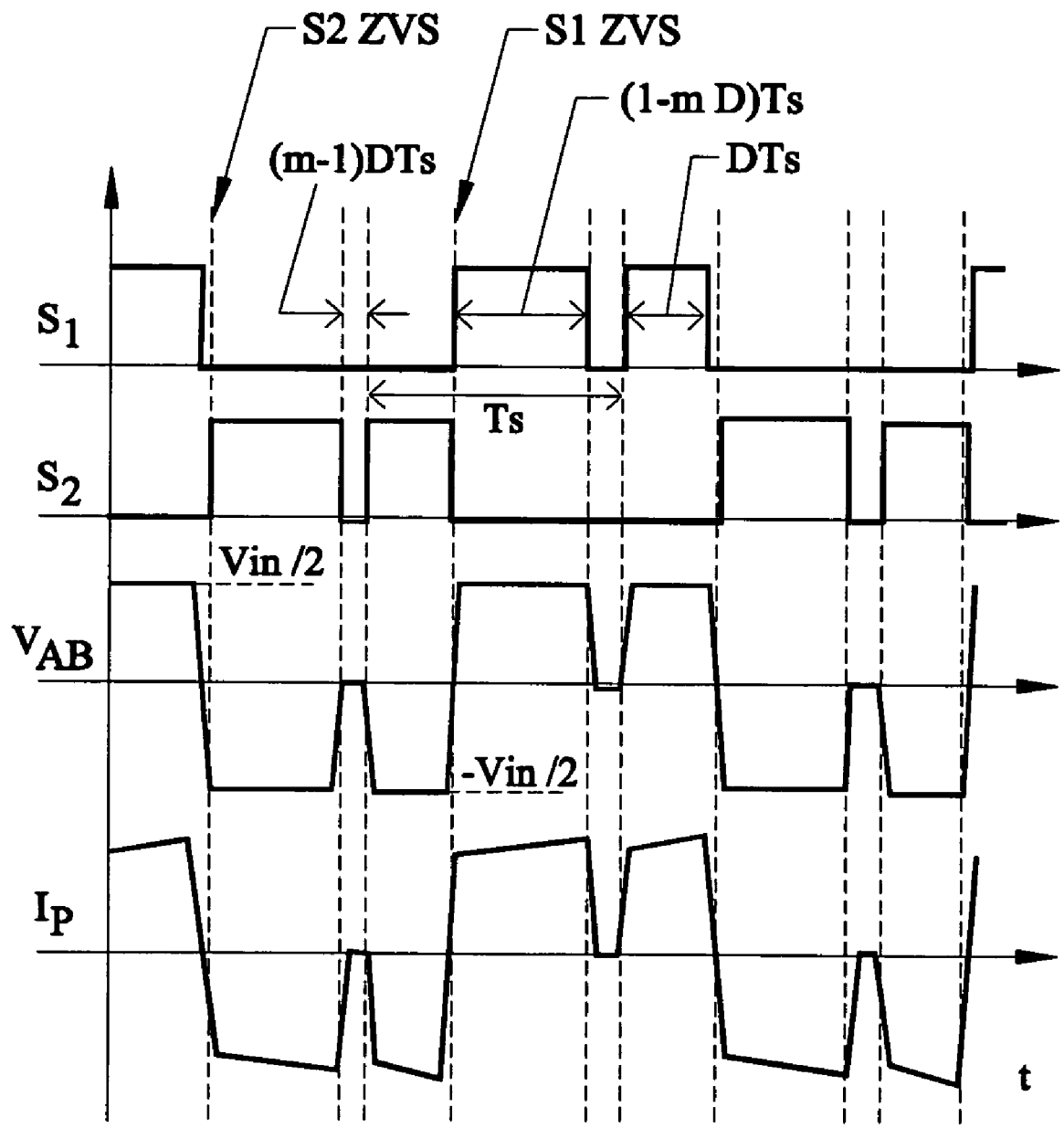
FIG. 4 shows the alternated duty cycle control signals applied to the converter shown in FIG. 1 and the voltage and current generated by the converter.

FIG. 4 shows theoretical main switching waveforms of the alternated duty cycle controlled half-bridge of FIG. 1. The main modes of operation are summarized as follows:

Mode 1 ($t_0 < t < t_1$): $S_1$ is ON and $S_2$ is OFF during this mode starting $t=t_0$, and the input power is being delivered to the output through $L_1$ and $SR_2$ which is also ON during this mode (SR1 is OFF). During this mode, $L_1$ is charged and $L_2$ discharges through $SR_2$. This mode continues for a duration of approximately $(1-mD)T_s$, where $1<m<1/D$.

In Mode 2 ($t_1 < t < t_2$): $S_1$ is turned OFF at $t=t_1$ and $SR_1$ and $SR_2$ are turned ON, causing the primary current $I_P$ to charge $S_1$ junction capacitance $C_{j1}$ and discharge $C_{j2}$. When the secondary side switches $S_{R1}$ and $S_{R2}$ start to discharge, the isolation transformer leakage inductance $L_K$ and the primary side switches' junction capacitances, $C_{j1}$ and $C_{j2}$, oscillate on the primary side.

In Mode 3 ($t_2 < t < t_3$): At $t=t_2$, $S_1$ is turned ON again. This mode is similar to Mode 1 except that it lasts for duration of $DT_s$.

Mode 4 ($t_3 < t < t_4$): $S_1$ is turned OFF at $t=t_3$, causing the primary current $I_P$ to charge $C_{j1}$ and discharge $C_{j2}$. During Mode 4, the reflected secondary inductor current dominates the primary current $I_P$. Therefore, the voltage across $C_{j2}$ may be discharged to zero, which provides wide zero-voltage-switching condition for $S_2$.

Mode 5 ($t_4 < t < t_5$): At $t=t_4$, $S_2$ is turned ON with zero-voltage-switching. $SR_1$ is ON and $SR_2$ is OFF. During mode 5 the input power is being delivered to the output through $L_2$ and $SR_1$. $L_2$ is charged and $L_1$ freewheels (discharges) through $SR_1$. This mode last for duration of $(1-mD)T_s$.

Mode 6 ($t_5 < t < t_6$): $S_2$ is turned OFF at $t=t_5$ and $SR_1$ and $SR_2$ are turned ON, causing the primary current $I_P$ to charge $C_{j2}$ and discharge $C_{j1}$. When the secondary side switches $SR_1$ and $SR_2$ start to discharge, the isolation transformer leakage inductance $L_K$ and the primary side switches' junction capacitances, $C_{j1}$ and $C_{j2}$, oscillate on the primary side.

Mode 7 ($t_6 < t < t_6$): At $t=t_6$, $S_2$ is turned ON again. This mode is similar to Mode 5 except that it lasts for duration of $DT_s$.

Mode 8 ($t_7 < t < t_8$): $S_2$ is turned OFF at $t=t_7$, causing the primary current $I_P$ to charge $C_{j1}$ and discharge $C_{j2}$. During this Mode, the reflected secondary inductor current dominates the primary current $I_P$. Therefore, the voltage across $C_{j1}$ may be discharged to zero, which provides wide zero-voltage-switching condition for $S_1$. After this, Mode 1 starts again by turning ON $S_1$ with zero-voltage-switching.

From FIG. 4 and the above modes of operation description, it is noticed that when the falling edge of one switch gate signal is close to the rising edge of the other switch, zero-voltage-switching is achieved for the other switch by utilizing the leakage inductor stored energy $I_P$. Alternating zero-voltage-switching is achieved for the two half-bridge switches $S_1$ and $S_2$.

It is shown that by simply applying the volt-second-balance across the output inductors that the voltage gain equation for the ADC controlled half-bridge is given by:

$$V_o/V_s=[1-D(m-1)]/2 \text{ or } V_o/V_{in}=1/4n \cdot [1-D(m-1)], \quad 1<m<1/D \quad (1)$$

Which means that $$D=(V_g-2V_o)/(V_g(m-1)) \quad (2)$$

Figure 5:
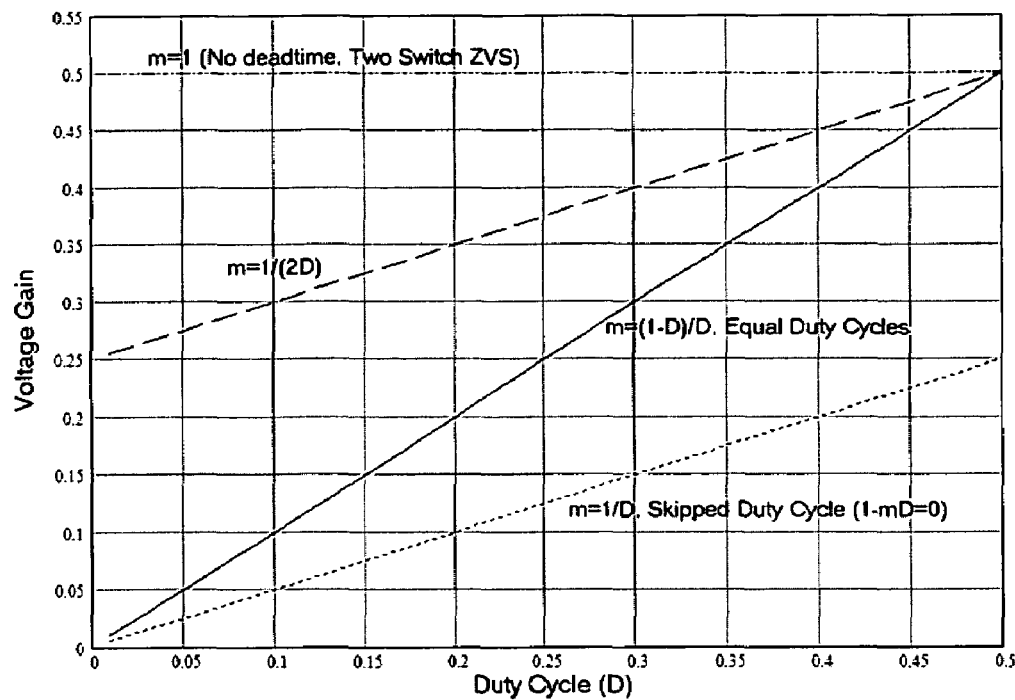
FIG. 5 shows voltage gain versus Duty Cycle for different values of m.

FIG. 5 shows the voltage gain versus duty cycle for different values of m.

The output current ripple equation is given by:

$$\Delta I_o=((2D(m-1)/(L \cdot f_s)) \cdot V_o=(2V_o)/(V_g) \cdot (V_g-2V_o)/(L \cdot f_s), \quad (3)$$

$V_g=V_{in}/2n$ for ADC controlled half-bridge.

In the preferred embodiment, the duty cycles are approximately equal for $m=(1-D)/D$ as shown in FIG. 5.

Figure 6:
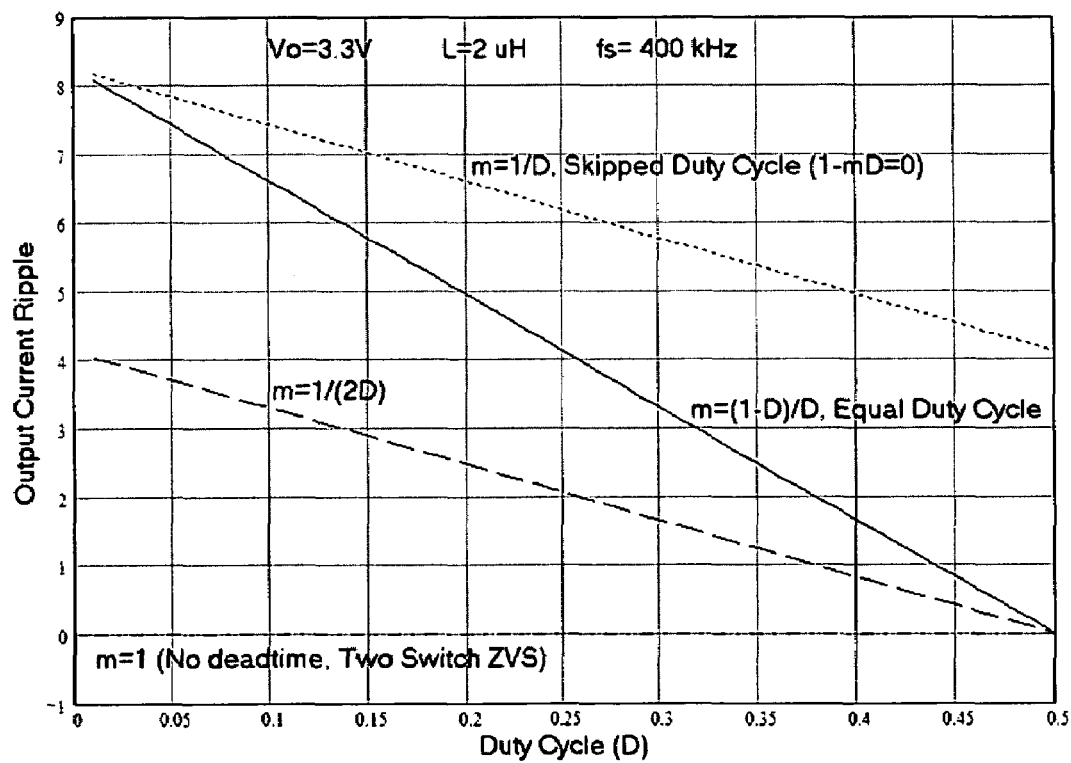
FIG. 6 shows output current ripple versus Duty Cycle at different m values for $V_o$=3.3 volts, L=2 µH and $f_s$=400 kHz.

FIG. 6 shows the output current ripple versus duty cycle from Equation (3) for $V_o=3.3$, $L=2$ µH, and $f_s=400$ kHz at different m values. As shown, as m gets smaller and approaches one, the output current ripple is reduced.

For example, a 100 W half-bridge DC-to-DC converter as shown in FIG. 1 with nominal input voltage $V_{in}=48$ volts and output voltage of $V_o=3.3$ volts was built in the laboratory for verification and evaluation. The switching frequency per switch was 400 kHz and with output inductors $L_1=L_2=500$ nH. At the secondary side, synchronous rectifiers (SRs) are paralleled in each of the two current doubler channels. In this example, the half-bridge DC-to-DC converter uses an alternated duty cycle with approximately equal duty cycles of $m=(1-D)/D$.

The half-bridge topology of FIG. 1 was controlled by the ADC control of FIG. 2, where soft-switching is alternated between $S_1$ and $S_2$. As shown in FIG. 2, in one switching cycle, the rising edge of $S_1$ is close to the falling edge of $S_2$ resulting in soft-switching for $S_1$ in this cycle, while in the following switching cycle the rising edge of $S_2$ is close to the falling edge of $S_1$ resulting in soft-switching for $S_2$ in this cycle, and so on soft switching is achieved alternatively for $S_1$ and $S_2$, one cycle for $S_1$ and one cycle for $S_2$.

Figure 7A:
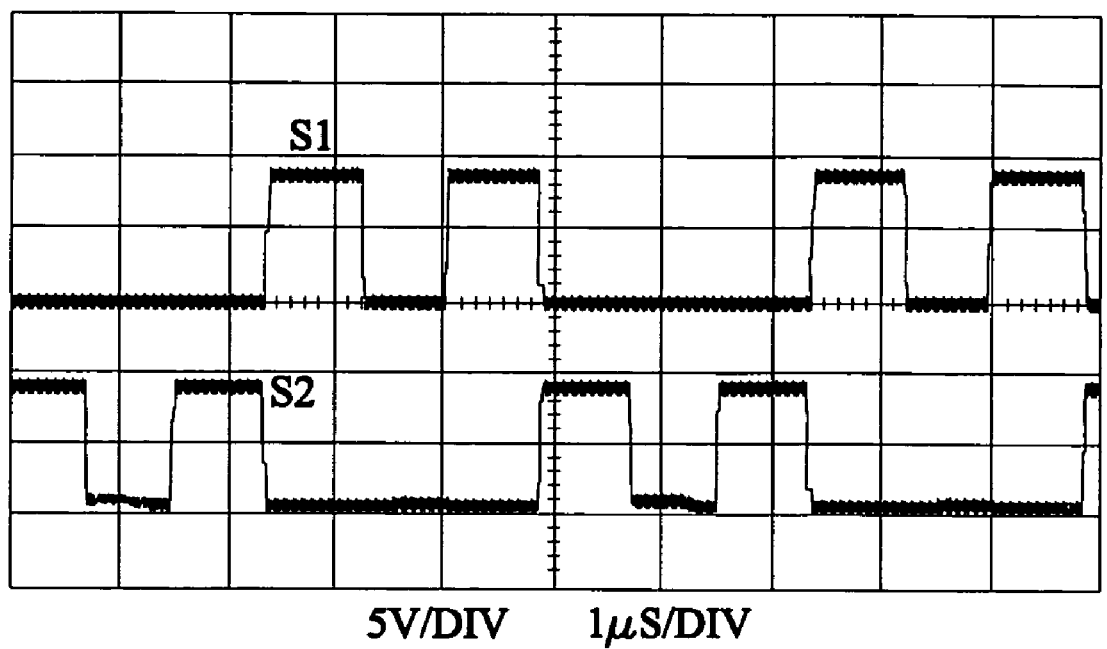
FIG. 7a shows experimental waveforms: $S_1$ and $S_2$ driving signals.
Figure 7B:
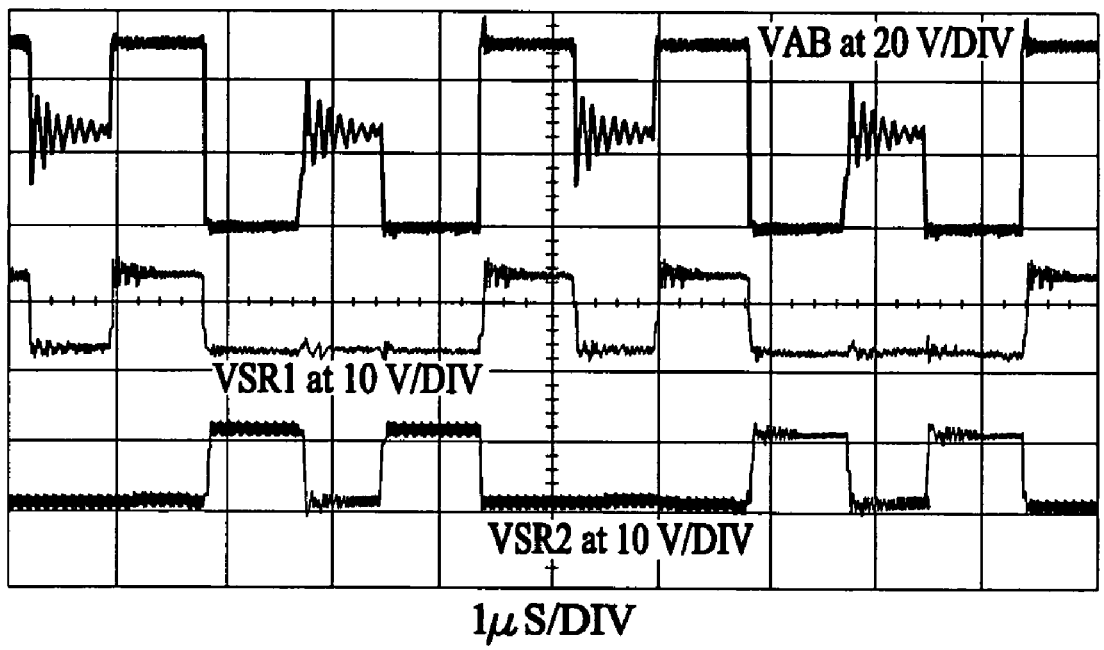
FIG. 7b shows the experimental waveforms: $S_{R1}$ and $S_{R2}$ voltages and the isolation transformer primary voltage.
Figure 8:
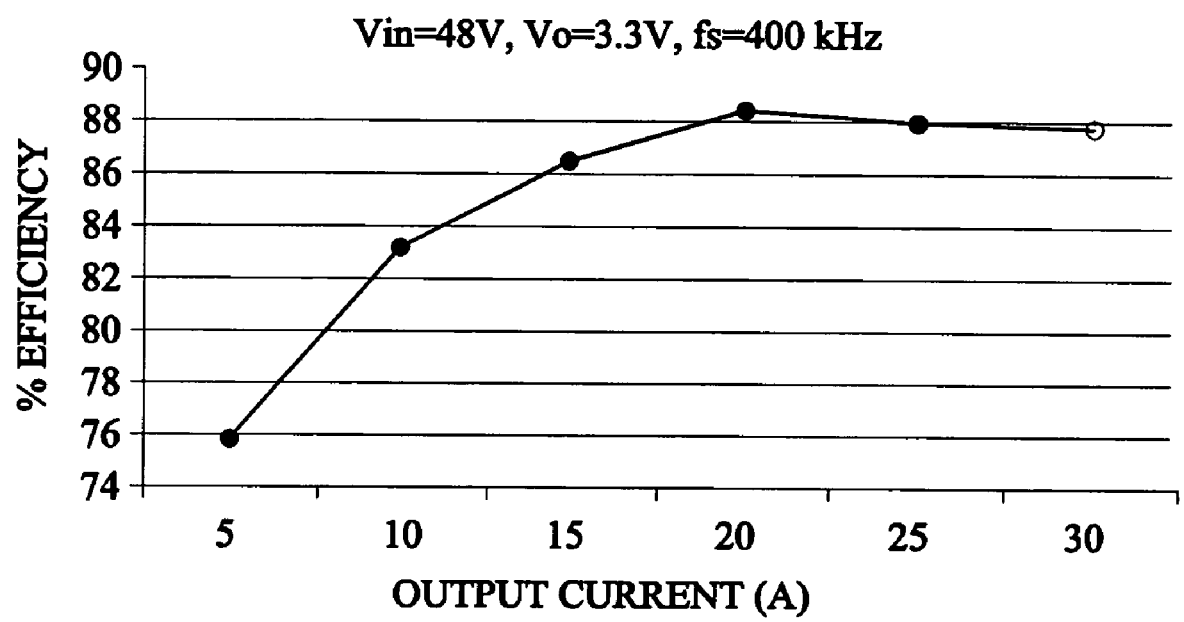
FIG. 8 shows an experimental efficiency curve.

FIGS. 7a and 7b shows some experimental waveforms while FIG. 8 shows the prototype measured efficiency curve. FIG. 7a shows the voltage across the two switches $S_1$ and $S_2$ alternates and FIG. 7b shown that zero-voltage switching is achieved alternately between $S_1$ and $S_2$. µ

Use of the alternated duty cycle control for a half-bridge converter as disclosed herein is the essence of this invention. Alternated duty cycle control achieve soft-switching for at least one switch of the two half-bridge switches. When soft-switching can be only achieved for one switch, ADC control alternates the soft-switching realization between the two switches so that each switch will be soft-switched during half of the time and hard-switched during the other half, keeping equal power losses distribution between the switches. Moreover, any asymmetry in the duty cycle will not cause asymmetric components stresses, DC transformer bias, or nonlinear DC gain when ADC control is used.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A half-bridge DC-to-DC converter having alternated duty cycle control comprising:

a primary side circuit having a half-bridge rectifier having a transformer with a primary and a secondary side, a serial first and a second half-bridge switch in parallel with a serial first and second half-bridge capacitor across an input voltage source, a common end of the first and second half-bridge capacitor connected to one end of the transformer primary and a common end of the first and second half-bridge switch connected to the opposite end of the transformer primary;

a secondary side circuit having a first and second inductor serially connected across the transformer secondary and a first and a second secondary side switch connected in series with the first and second inductor, respectively, wherein the input power is delivered to the output alternatingly through the first and second inductor and corresponding one of the first and second secondary side switches; and an alternated duty cycle controller for producing alternating first and second control signals for controlling the first and second half-bridge switches on the primary side for alternating zero-voltage switching of the first and second half-bridge switches during alternating switching cycles, keeping equal power losses distribution between the first and second half-bridge switches.

2. The converter of claim 1, further comprising:

an approximately equal duty cycle for each of the first and the second alternated duty cycle control signal.

3. The converter of claim 2, wherein the approximately equal duty cycle is calculated according to $m=(1-D)/D$.

4. The converter of claim 1, wherein the pulse-width-modulated controller comprises:

a digital alternated duty cycle modulator for producing the alternated duty cycle control signal.

5. The converter of claim 1, wherein the pulse-width-modulated controller comprises:

an analog alternated duty cycle modulator for producing the alternated duty cycle control signal.

6. A method of driving a half-bridge DC-to-DC converter comprising the steps of:

providing a half-bridge DC-to-DC converter having a transformer with a primary side connected across the input voltage and a secondary side for providing an output voltage, wherein first and second half-bridge switches and first and second half-bridge capacitors are connected with opposite ends of the transformer primary and a first and second secondary switch and first and second secondary inductor are connected to opposite ends of the transformer secondary;

generating a first and a second alternated duty cycle control signal for controlling the first and second half-bridge switches;

applying the first and a second alternated duty cycle control signal to the first and second half-bridge switch for zero-voltage-switching of the first and a second half-bridge switch during alternating switching cycles, one switching cycle for the first half-bridge and second switching cycle for the second half-bridge switch for alternated duty cycle control.

7. The method of claim 6 wherein the applying step alternatingly soft-switches each one of the first and the second half-bridge switches of the two half-bridge switch so that each switch will be soft-switched during half of the time and hard-switched during the other half, keeping equal power losses distribution between the switches.

8. The method of claim 6, wherein the alternated duty cycle control signal generating step comprises the step of:
generating a first and second pulse width modulated signal; and
using the first and second pulse width modulated signal to produce the first and a second alternated duty cycle pulse width modulated control signal having zero-voltage-switching of alternating ones of the first and the second alternated duty cycle pulse width modulated control signal for alternatingly soft-switching the first and the second half-bridge switches of the half-bridge DC-to-DC converter.

9. The method of claim 6, wherein the first and second alternated duty cycle control signal generation step comprises the step of:
generating the first and second alternated duty cycle control signals having an approximately equal duty cycle for each of the first and second alternated duty cycle control signal.

10. The method of claim 6, wherein the generating a first and a second alternated duty cycle control signal step comprises the step of:
adapting a pulse width modulated control signal to generate the alternated first and second control signals for alternated duty cycle pulse width modulation control.

11. The method of claim 6, wherein the step of applying the first and a second alternated duty cycle control signal to the first and second half-bridge switch comprises the step of:
switching the first half-bridge switch and the second half-bridge switch off, wherein input power is delivered to an output through the first secondary inductor and the first secondary switch;
switching the first half-bridge switch off;
switching the first half-bridge switch on;
switching the first half-bridge switch off to provide wide zero-voltage switching for the second half-bridge switch;
switching the second half-bridge switch on with zero voltage-switching which switches the first secondary switch on and the second secondary switch off to deliver input power to the output through the second secondary inductor and the first secondary switch;
switching the second half-bridge switch off which switches the first and second secondary switches on;
switching the second half-bridge switch on;
switching the second half-bridge switch off to provide wide zero-voltage-switching for the first half-bridge switch; and
repeating the steps for alternated zero-voltage switching of the first and second half-bridge switches during alternating switching cycles.

* * * * *

UNITED STATES PATENT AND TRADEMARK OFFICE
CERTIFICATE OF CORRECTION

PATENT NO. : 7,196,916 B2
APPLICATION NO. : 11/353822
DATED : March 27, 2007
INVENTOR(S) : Issa Batarseh Page 1 of 1

It is certified that error appears in the above-identified patent and that said Letters Patent is hereby corrected as shown below:

Title Page, item [60] should read as follows:
"The application claims the benefit of U.S. Provisional Patent Application No. 60/652,672 filed 02/14/2005."

Signed and Sealed this
First Day of March, 2011

David J. Kappos
*Director of the United States Patent and Trademark Office*